United States Patent
Mahood et al.

(10) Patent No.: US 10,587,539 B2
(45) Date of Patent: Mar. 10, 2020

(54) IDENTIFYING RELATIONSHIPS BETWEEN MESSAGE THREADS

(71) Applicant: Microsoft Technology Licensing, LLC, Redmond, WA (US)

(72) Inventors: Justin Mahood, Seattle, WA (US); Tali Roth, Kirkland, WA (US); Rajesh Ramanathan, Redmond, WA (US); Rafael Barcelos, Bellevue, WA (US); Linda Chen, Redmond, WA (US); Giselli Panontini DeSouza Sana, Redmond, WA (US); Ryan Gregg, Seattle, WA (US)

(73) Assignee: Microsoct Technology Licensing, LLC, Redmond, WA (US)

( * ) Notice: Subject to any disclaimer, the term of this patent is extended or adjusted under 35 U.S.C. 154(b) by 697 days.

(21) Appl. No.: 14/209,604

(22) Filed: Mar. 13, 2014

(65) Prior Publication Data
US 2015/0263995 A1    Sep. 17, 2015

(51) Int. Cl.
*G06F 3/00* (2006.01)
*H04L 12/58* (2006.01)
(Continued)

(52) U.S. Cl.
CPC .......... *H04L 51/04* (2013.01); *G06F 3/0481* (2013.01); *G06Q 10/107* (2013.01)

(58) Field of Classification Search
CPC .. G06F 3/0481; G06F 3/0482; G06F 3/04842; G06F 21/60; G06F 3/0484; G06F 16/248; G06F 21/445; G06F 21/602; G06F 21/606; G06F 16/24575; G06F 16/38; G06F 16/9577; G06F 17/212; G06F 17/2247; G06F 17/2785; G06F 3/048; G06F 16/3329; G06F 16/9535; G06F 17/24; G06F 17/2775; G06F 17/279; G06F 3/04847; G06F 9/451; G06F 16/24565; G06F 16/285; G06F 16/35; G06F 16/353; G06F 16/48; G06F 16/9024; G06F 16/93; G06F 16/951; G06F 17/2235; G06F 17/241;
(Continued)

(56) References Cited

U.S. PATENT DOCUMENTS 7,103,634 B1    9/2006 Ullmann et al.
7,222,299 B1    5/2007 Lim et al.
(Continued)

FOREIGN PATENT DOCUMENTS

CN    101090409 A    12/2007
CN    102273234 A    12/2011
WO    WO 2006083820 A2    8/2006

OTHER PUBLICATIONS

Wang, et al., "Recovering Implicit Thread Structure in Newsgroup Style Conversations", In Proceedings of the Second International Conference on Weblogs and Social Media, Mar. 30, 2008, 9 pages.
(Continued)

*Primary Examiner* — Di Xiao
(74) *Attorney, Agent, or Firm* — Christopher J. Volkman; Kelly, Holt & Christenson, PLLC

(57) ABSTRACT

A message related to a first thread is received, and a fork in the conversation is identified. The received message is placed in a second thread and a display shows the fork and that the two threads are related.

20 Claims, 18 Drawing Sheets

(51) Int. Cl.
    *G06F 3/0481* (2013.01)
    *G06Q 10/10* (2012.01)

(58) Field of Classification Search
    CPC .... G06F 21/64; G06F 3/04817; G06F 3/0485;
    G06F 16/116; G06F 16/13; G06F 16/16;
    G06F 16/164; G06F 16/168; G06F
    16/176; G06F 16/178; G06F 16/182;
    G06F 16/183; G06F 16/2379; G06F
    16/24578
    See application file for complete search history.

(56) References Cited

U.S. PATENT DOCUMENTS

| | | | |
|---|---|---|---|
| 7,395,315 | B2 | 7/2008 | Colson et al. |
| 7,506,263 | B1 | 3/2009 | Johnston et al. |
| 7,921,176 | B2 | 4/2011 | Madnani |
| 8,185,482 | B2 | 5/2012 | Yang et al. |
| 8,332,477 | B1* | 12/2012 | Kaiserlian ............... H04L 51/16 709/206 |
| 8,645,430 | B2 | 2/2014 | Khouri et al. |
| 8,780,703 | B1 | 7/2014 | Eidelson et al. |
| 9,043,411 | B2 | 5/2015 | Claux et al. |
| 2004/0202117 | A1* | 10/2004 | Wilson ............... H04L 12/1827 370/310 |
| 2004/0260756 | A1* | 12/2004 | Forstall ............... H04L 51/00 709/200 |
| 2005/0108402 | A1 | 5/2005 | Colson et al. |
| 2005/0149621 | A1 | 7/2005 | Kirkland et al. |
| 2006/0271630 | A1* | 11/2006 | Bensky ............... G06Q 10/107 709/206 |
| 2007/0282956 | A1 | 12/2007 | Staats |
| 2009/0044200 | A1 | 2/2009 | Bordia et al. |
| 2009/0176521 | A1 | 7/2009 | Klassen et al. |
| 2009/0239504 | A1 | 9/2009 | Turk |
| 2009/0254624 | A1 | 10/2009 | Baudin et al. |
| 2010/0167766 | A1 | 7/2010 | Duarte et al. |
| 2010/0293475 | A1 | 11/2010 | Nottingham et al. |
| 2011/0191429 | A1 | 8/2011 | Tu et al. |
| 2011/0196933 | A1 | 8/2011 | Jackson et al. |
| 2011/0263278 | A1 | 10/2011 | Riddle et al. |
| 2012/0036197 | A1 | 2/2012 | Bishop |
| 2012/0124146 | A1 | 5/2012 | Hsiao et al. |
| 2012/0124147 | A1* | 5/2012 | Hamlin ............... H04L 51/36 709/206 |
| 2012/0124483 | A1 | 5/2012 | Zuckerberg et al. |
| 2012/0173243 | A1 | 7/2012 | Anand et al. |
| 2012/0198017 | A1 | 8/2012 | LeVasseur et al. |
| 2012/0221638 | A1 | 8/2012 | Edamadaka et al. |
| 2012/0311055 | A1 | 12/2012 | Adams et al. |
| 2013/0024780 | A1 | 1/2013 | Sutedja et al. |
| 2013/0091227 | A1 | 4/2013 | Bhakar et al. |
| 2013/0124548 | A1 | 5/2013 | Chhaparia et al. |
| 2013/0124643 | A1 | 5/2013 | DeLuca et al. |
| 2013/0218885 | A1 | 8/2013 | Satyanarayanan |
| 2013/0290435 | A1 | 10/2013 | Martin et al. |
| 2013/0290436 | A1 | 10/2013 | Martin et al. |
| 2014/0245178 | A1* | 8/2014 | Smith ............... H04L 51/16 715/753 |
| 2014/0304505 | A1 | 10/2014 | Dawson |
| 2015/0113076 | A1* | 4/2015 | Dubie ............... H04L 51/16 709/206 |
| 2015/0127749 | A1 | 5/2015 | Mishanski |
| 2015/0207768 | A1 | 7/2015 | Mahood et al. |
| 2015/0281143 | A1 | 10/2015 | Wang |
| 2015/0281165 | A1 | 10/2015 | Chao |
| 2016/0021033 | A1 | 1/2016 | Peterson et al. |
| 2017/0034084 | A1 | 2/2017 | Brunsen |
| 2018/0089308 | A1 | 3/2018 | Barsness et al. |

OTHER PUBLICATIONS

Joshi, et al., "Auto-Grouping Emails for Faster E-Discovery", In Proceedings of VLDB Endowment, vol. 4, Issue 12, Aug. 29, 2011, 11 pages.

Mahood, et al., "System for Deriving Atomic Communication Threads from Independently Addressable Messages", unfiled US Patent Application.

Second Written Opinion for International Patent Application No. PCT/US2015/019549, dated Feb. 25, 2016, date of filing: Mar. 10, 2015, 6 pages.

International Preliminary Report on Patentability for International Patent Application No. PCT/US2015/019549, dated Apr. 1, 2016, date of filing: Mar. 10, 2015, 12 pages.

Non-Final Office Action for U.S. Appl. No. 14/162,125 dated May 6, 2016, 16 pages.

International Search Report and Written Opinion for International Application No. PCT/US2015/019549, dated Jun. 16, 2015, date of filing: Mar. 10, 2015, 10 pages.

International Search Report and Written Opinion for International Application No. PCT/US2015/012 26, dated Apr. 21, 2015, date of filing: Jan. 22, 2015, 9 pages.

Wang, et al., "Email Conversations Reconstruction Based on Messages Threading for Multiperson", In International Workshop on Education Technology and Training, and International Workshop on Geoscience and Remote Sensing, vol. 1, Dec. 21, 2008, 5 pages.

Application and Drawings for U.S. Appl. No. 14/162,125, filed Jan. 23, 2014, 34 pages.

International Preliminary Report on Patentability for International Application No. PCT/US2015/012326, dated Oct. 23, 2015, date of filing: Jan. 22, 2015, 19 pages.

International Preliminary Report on Patentability for International Application No. PCT/US2015/012326 dated Nov. 6, 2015, 13 pages.

Prosecution History for U.S. Appl. No. 14/162,125 including: Final Office Action dated Nov. 23, 2016, and Amendment dated Sep. 6, 2016, 30 pages.

Amendment with RCE for U.S. Appl. No. 14/162,125 dated Feb. 4, 2017, 15 pages.

Non-Final Office Action for U.S. Appl. No. 14/162,125 dated May 4, 2017, 25 pages.

Final Office Action for U.S. Appl. No. 14/162,125 dated Oct. 27, 2017, 24 pages.

Horowitz, Paul, "Get Notifications for Specific Email Threads in iOS Mail App", Published on: Nov. 13, 2014 Available at: http://osxdaily.com/2014/11/13/enable-notifications-email-thread-ios-mail/.

"International Search Report and Written Opinion Issued in PCT Application No. PCT/US2017/054648", dated Jan. 9, 2018, 12 pages.

Prosecution History for U.S. Appl. No. 14/162,125 including: RCE dated Jan. 3, 2018, Advisory Action dated Dec. 26, 2017, and Amendment After Final dated Dec. 14, 2017, 25 pages.

Prosecution History for U.S. Appl. No. 15/286,102 including: Non-Final Office Action dated Mar. 22, 2018 and Application and Drawings filed Oct. 5, 2016, 63 pages.

Amendment for U.S. Appl. No. 14/162,125 dated Aug. 4, 2017, 17 pages.

"Non Final Office Action Issued in U.S. Appl. No. 14/162,125", dated Apr. 13, 2018, 26 Pages.

"Office Action Issued in European Patent Application No. 15704135.1" dated Jul. 27, 2017, 3 Pages.

"First Office Action and Search Report Issued in Chinese Patent Application No. 201580008932.3" dated Aug. 30, 2018, 10 Pages.

"Final Office Action Issued in U.S. Appl. No. 14/162,125", dated Sep. 19, 2018, 28 Pages.

"Final Office Action Issued in U.S. Appl. No. 15/268,102" dated Sep. 17, 2018, 26 Pages.

"Non Final Office Action Issued in U.S. Appl. No. 15/286,102", dated Mar. 21, 2019, 30 Pages.

* cited by examiner

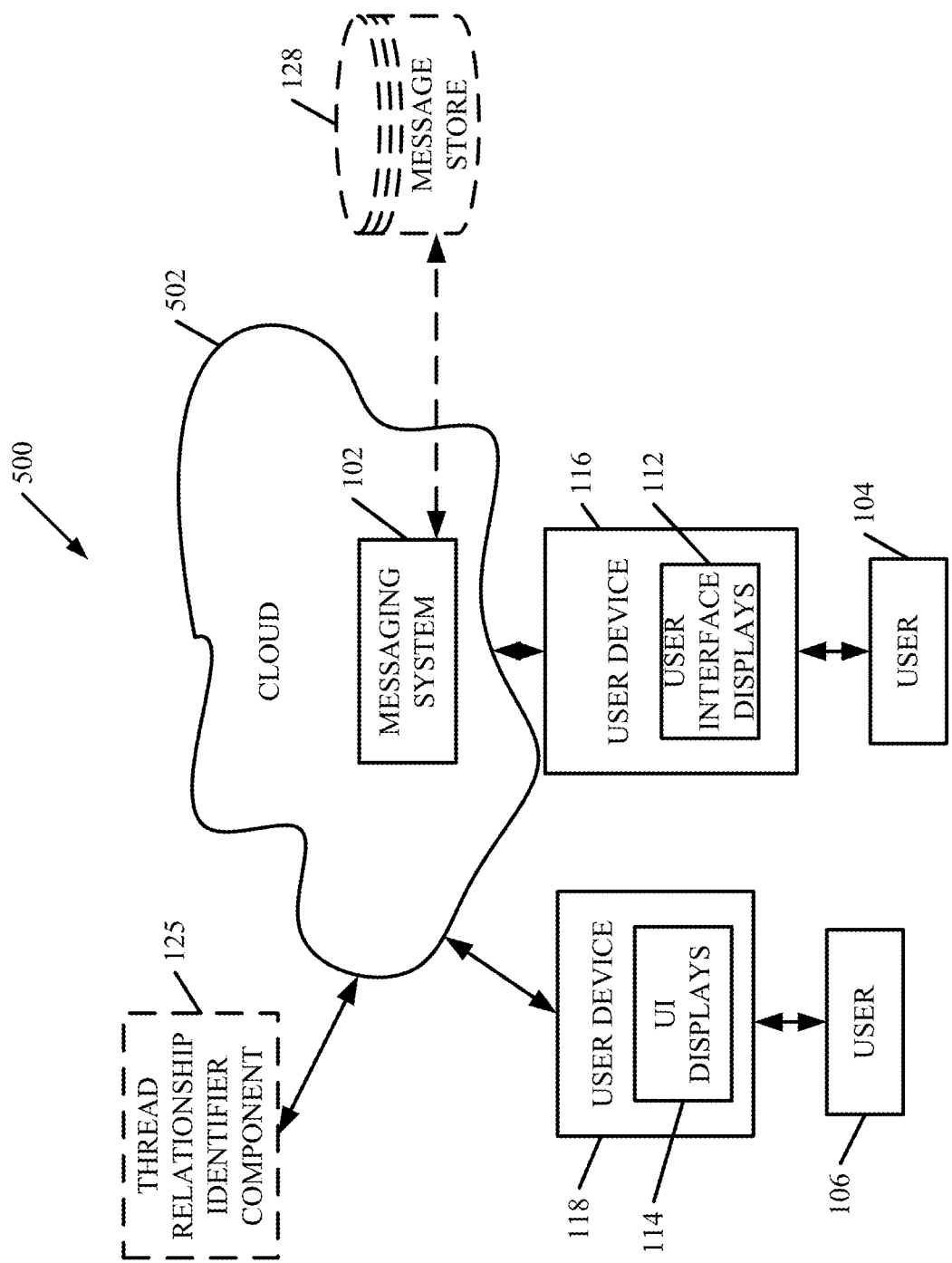

IDENTIFYING RELATIONSHIPS BETWEEN MESSAGE THREADS

BACKGROUND

Computer systems are currently in wide use. Some computer systems include messaging systems by which users can send messages back and forth to one another.

There are a wide variety of different types of messaging systems. They can include, for instance, electronic mail (e-mail) messaging systems, text messaging systems, social network messaging systems, among others. In these types of messaging systems, it is common for a user to send a message to one or more recipients. The recipients can then reply to all of the other recipients, to a subset of those recipients, or add additional recipients. If multiple people reply to the same message, then if a user wishes to respond to each of the messages, the user normally needs to manually aggregate all of the related messages and respond individually to those messages. Also, if a user wants to act on the whole set of messages (for instance, to move the set to a folder) then the user would normally have to act on each individually.

Some systems have attempted to group messages into conversations. However, this normally entails simply grouping sets of messages together based upon their topic. A user who wishes to reply to forked messages in the conversation still normally needs to read and respond to each individual message.

The discussion above is merely provided for general background information and is not intended to be used as an aid in determining the scope of the claimed subject matter.

SUMMARY

A message related to a first thread is received, and a fork in the conversation is identified. The received message is placed in a second thread and a display shows the fork and that the two threads are related.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 7 shows one embodiment of the architecture shown in FIG. 1, deployed in a cloud computing architecture.

DETAILED DESCRIPTION

Figure 1:
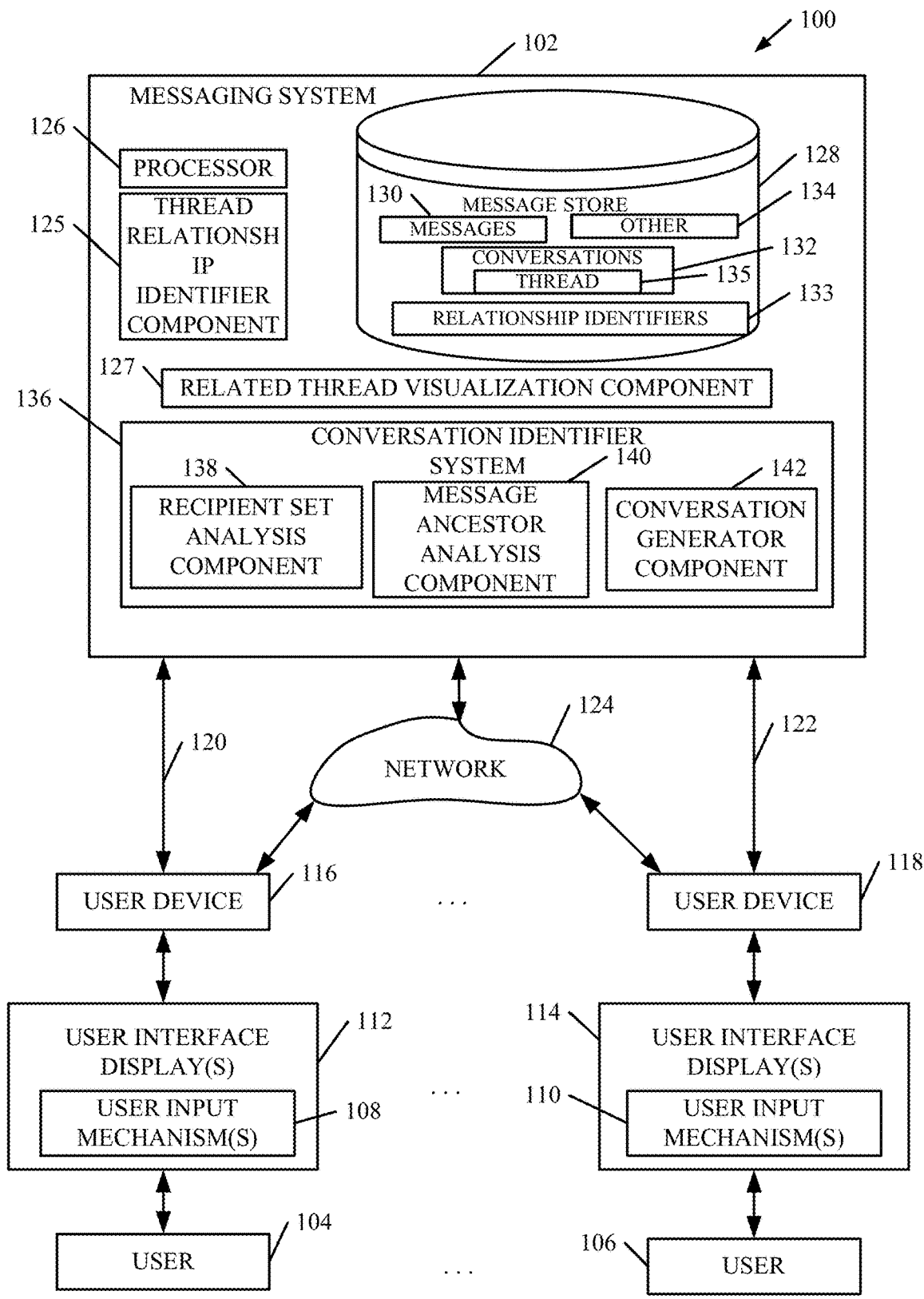
FIG. 1 is a block diagram of one illustrative messaging architecture.

FIG. 1 shows one block diagram of messaging architecture 100. While messaging architecture 100 can be a variety of different types of messaging systems (some of which include instant messaging in real time communications, text messaging systems, social-network messaging systems, etc.), it will be described as an e-mail system for the sake of example.

Also, as used herein, a conversation means a collection of messages that are related by ancestry: for instance, they are directly or indirectly derived—via Reply, Reply All, or Forward—from a common root message. A thread is a collection of messages related by ancestry and by participants. In one embodiment, messages in a given thread share the same set of participants or where the participants grow over time. Threads can be acted on as a unit.

Messaging architecture 100 includes messaging system 102 that is accessed by users 104-106, each of whom illustratively interact with user input mechanisms 108-110 on user interface displays 112-114 that are generated by user devices 116-118. Users 104 and 106 can interact with the user input mechanisms 108 and 110 to generate electronic mail messages, and replies, and send them to one another using messaging system 102. They can also act on messages in other ways as well, such as by placing them in a folder, or in other ways. FIG. 1 also shows that user devices 116-118 can access messaging system 102 either directly (as indicated by arrows 120 and 122), or over network 124. It will also be appreciated that messaging system 102 can be used by many other users as well, but only two users 104-106 are shown for the sake of example.

FIG. 1 further shows that messaging system 102 illustratively includes thread relationship identifier component 125, processor (or server) 126, related thread visualization component 127, message store 128, (which, itself, stores messages 130, conversations 132, thread relationship identifiers 133, threads 135 within conversations 132, and can store other information 134 as well). Messaging system 102 also illustratively includes conversation/thread identifier system 136. System 136 illustratively includes recipient set analysis component 138, message ancestor analysis component 140 and conversation/thread generator component 142. It can include other components or systems as well, and those shown in FIG. 1 are shown for the sake of example only.

Messages 130 illustratively include all messages that are sent by the users of messaging system 102. Conversations 132 illustratively include message identifiers that identify various messages 130 that belong to various different conversations. Messages 130 can also belong to a thread 135 within conversation 132. For instance, conversation/thread identifier system 136 illustratively identifies atomic communication threads 135 based on a series of independently addressable messages between users 104 and 106 (and other users). The threads 135 (e.g., within conversations 132) are identified over a message response chain (which can be a collection of message identifiers that indicate relationships between independent messages), as well as a set of recipients for each of the messages.

Where a conversation forks into different threads, thread relationship identifier component 125 identifies a relationship between the threads, and related thread visualization component 127 displays the relationship so it can be seen and interacted with by a user. Related threads are described in greater detail below with respect to FIGS. 5-6F.

Figure 2:
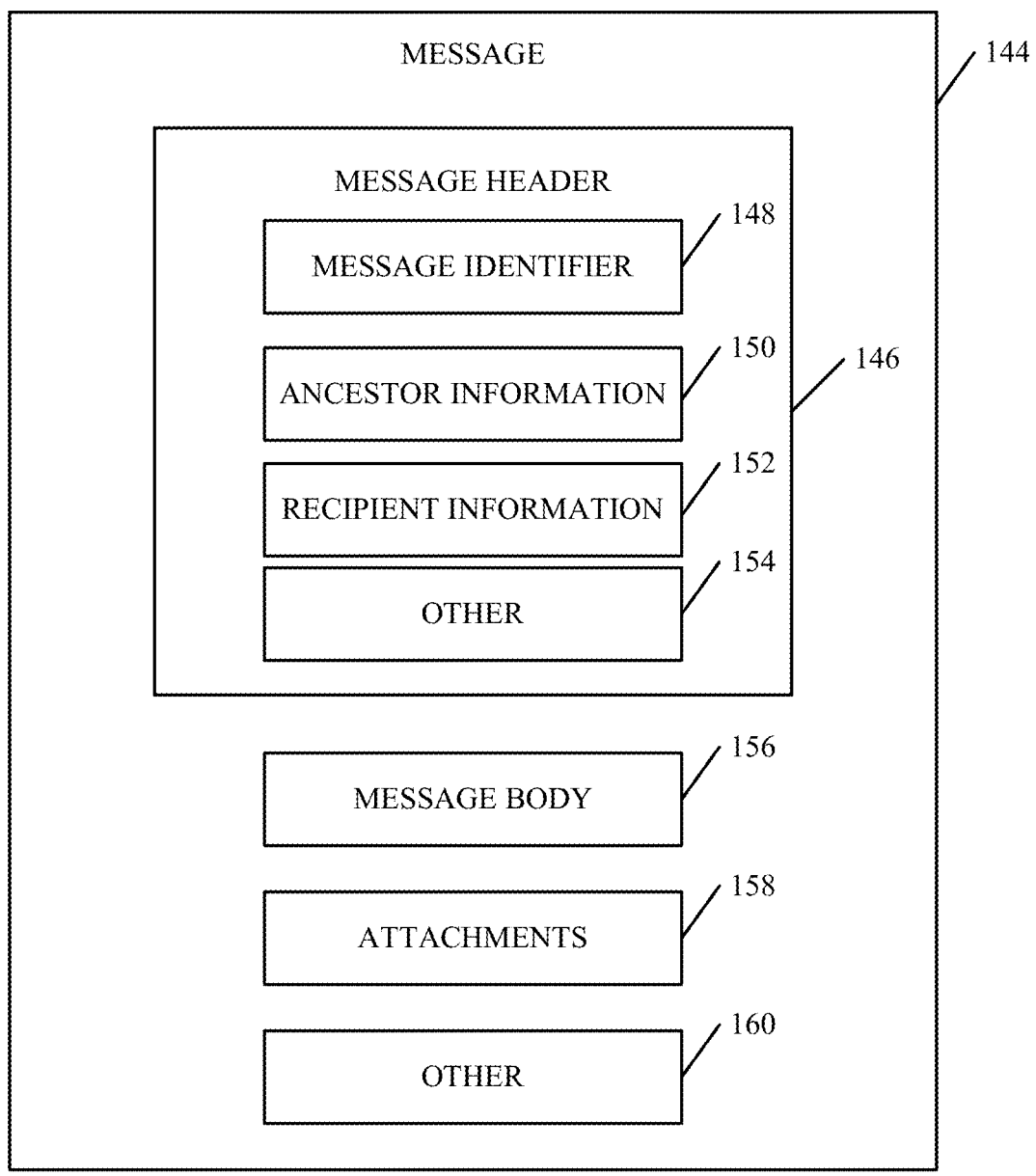
FIG. 2 is a block diagram of one illustrative message that can be sent in the architecture shown in FIG. 1.

FIG. 2 shows one illustrative block diagram of a message 144 that can be sent using messaging system 102. In the embodiment shown in FIG. 2, message 144 illustratively includes header information 146 (which, itself, includes a unique message identifier 148 that uniquely identifies message 144), ancestor information 150 that identifies the ancestor messages to message 144, recipient information 152 that identifies the recipients of message 144, and it can include other information 154 as well. FIG. 2 also shows that message 144 illustratively includes a message body 156 and it can include attachments 158 and other information 160 as well. It will be noted that the messages 144 can include other information as well, such as information identifying that the message was sent on behalf of someone else (e.g., a delegation scenario). In that case, the message will include an identifier that identifies a Sender, as well as a From field, but the person in the Sender field is different than the person in the From field.

In one embodiment, ancestor information 150 is information that includes the message identifier (and possibly thread relationship identifier) for any ancestor messages to message 144. By ancestor messages, it is meant messages that precede message 144 in an already existing conversation. For instance, if user 104 sends a first message to user 106, and user 106 replies to that message, then if message 144 represents the reply message, ancestor information 150 will identify the first message, to which message 144 is a reply. Further, if a third message is sent that is in reply to message 144, then the ancestor information 150 for the third message will include not only the message identifier for message 144, but also the message identifier for the first message, (the message that message 144 was in reply to). Thus, ancestor information 150 illustratively identifies all messages that precede the present message, in an already-existing conversation. It can also identify a message that the current thread forked from, or it can identify message 144 as the message that originated a new thread, or other information.

Before describing the overall operation of messaging system 102 in generating new conversations and new threads and adding messages to existing threads in existing conversations, a brief overview will be provided to enhance understanding. A thread within a conversation is illustratively identified as a collection of messages originating from a common ancestor, in which the set of recipients is the same or grows over time. For instance, when an individual message is received by messaging system 102, the message ancestor analysis component 140 illustratively looks for a parent of the newly received message (which will be a message that the newly received message is directly in reply to). This may be specified as part of the message header 146. If the parent exists, and the recipients of the newly received message are a superset of the recipients in the parent message, then the newly received message is added as part of an existing thread that includes the parent message. If the parent message is not found, or the new recipient set on the newly received message is not a superset of the previous recipients, then a new thread is created and the newly received message is added to the new thread. The parent/child relationship between the threads is identified, and this can be displayed so a user can quickly see, and navigate between related threads.

Figure 3:
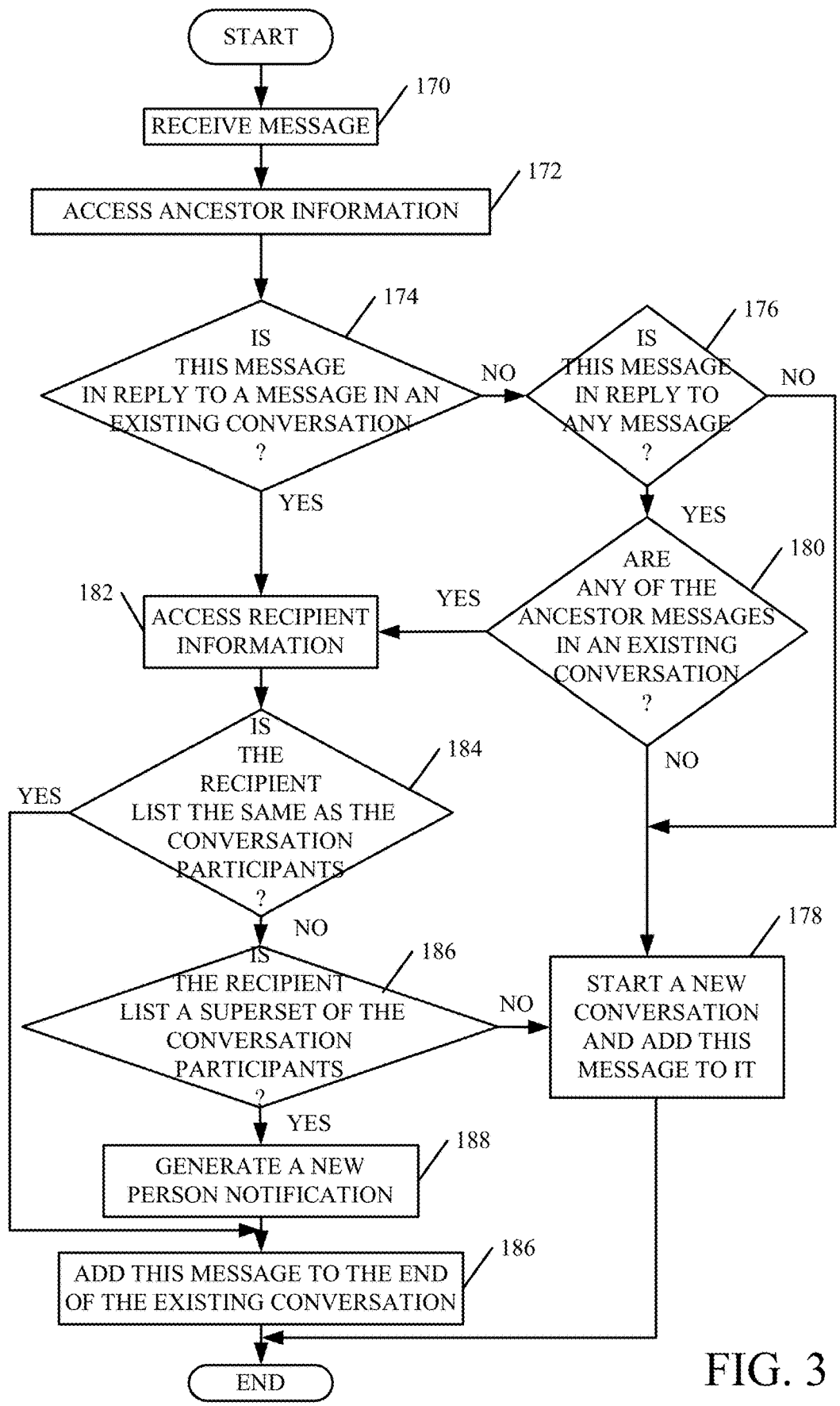
FIG. 3 is a flow diagram illustrating one embodiment of the operation of the architecture shown in FIG. 1 in generating conversations and adding messages to those conversations.

FIG. 3 is a flow diagram illustrating one embodiment of the operation of architecture 100 in generating new conversations and adding new messages to the new conversations and to threads in existing conversations, and to identifying forks in a conversation, in more detail. This is just one example of how threads can be created and forks identified.

It is first assumed that one of users 104 and 106 generates a message and sends it through messaging system 102. Receiving the message at messaging system 102 is indicated by block 170 in FIG. 3.

Message ancestor analysis component 140 then accesses the ancestor information 150 in the newly received message. This is indicated by block 172. Message ancestor analysis component 140 determines whether the newly received message is in reply to a message in an already existing conversation 132. This is indicated by block 174 in FIG. 3. If not, component 140 determines whether the newly received message is in reply to any message at all. This is indicated by block 176. If the newly received message is not a reply message, then conversation generator component 142 starts a new conversation 132 and stores the newly received message as part of the new conversation in message store 128. This is indicated by block 178 in FIG. 3.

Returning again to block 176, if message ancestor analysis component 140 determines that the newly received message is, in fact, a reply message, then component 140 determines whether any of the ancestor messages identified in the newly received message are also identified as being part of an already existing conversation 132. This is indicated by block 180. If not, this may mean that the newly received message is an out-of-order delivery in an asynchronous messaging system (like email). If that occurs, then even though the newly received message is a reply message, it is in reply to a message that is not part of any already-existing conversation. Therefore, again, conversation generator component 142 starts a new conversation and adds the newly received message to it, at block 178.

If, either at block 174 or 180, the parent message to the newly received message, or any of its ancestors, are in an already-existing conversation, then recipient set analysis component 138 accesses the recipient information 152 in the newly received message. This is indicated by block 182 in FIG. 3. If the recipient list in the newly received message is the same as the conversation participants (where the conversation participants are the set of recipients generated by concatenating the recipients from all messages from the identified conversation) then the newly received message is simply added to the end of the thread in the already-existing conversation (which the parent message or ancestor message is a part of). This is indicated by blocks 184 and 186 in the flow diagram of FIG. 3.

However, if at block 184, component 138 determines that the recipient list of the newly received message is not the same as the conversation participants, then component 138 determines whether the recipient list on the newly received message is a superset of the conversation participants. This is indicated by block 187. If not, then conversation generator component 142 again generates a new thread in the conversation and adds the newly received message to the new thread. The relationship between the threads is identified and displayed, and this is described in greater detail below with respect to FIGS. 5-6F.

However, if, at block 186, recipient set analysis component 138 determines that the recipient list on the newly received message is, in fact, a superset of the conversation participants, then the author of the newly received message has simply added a new recipient to the recipient list. A notification to that effect is added to the record for the newly received message. This is indicated by block 188. The newly received message is then added to the end of the thread in the existing conversation (which the parent or ancestor is a part of), as indicated by block 186.

Figure 4:
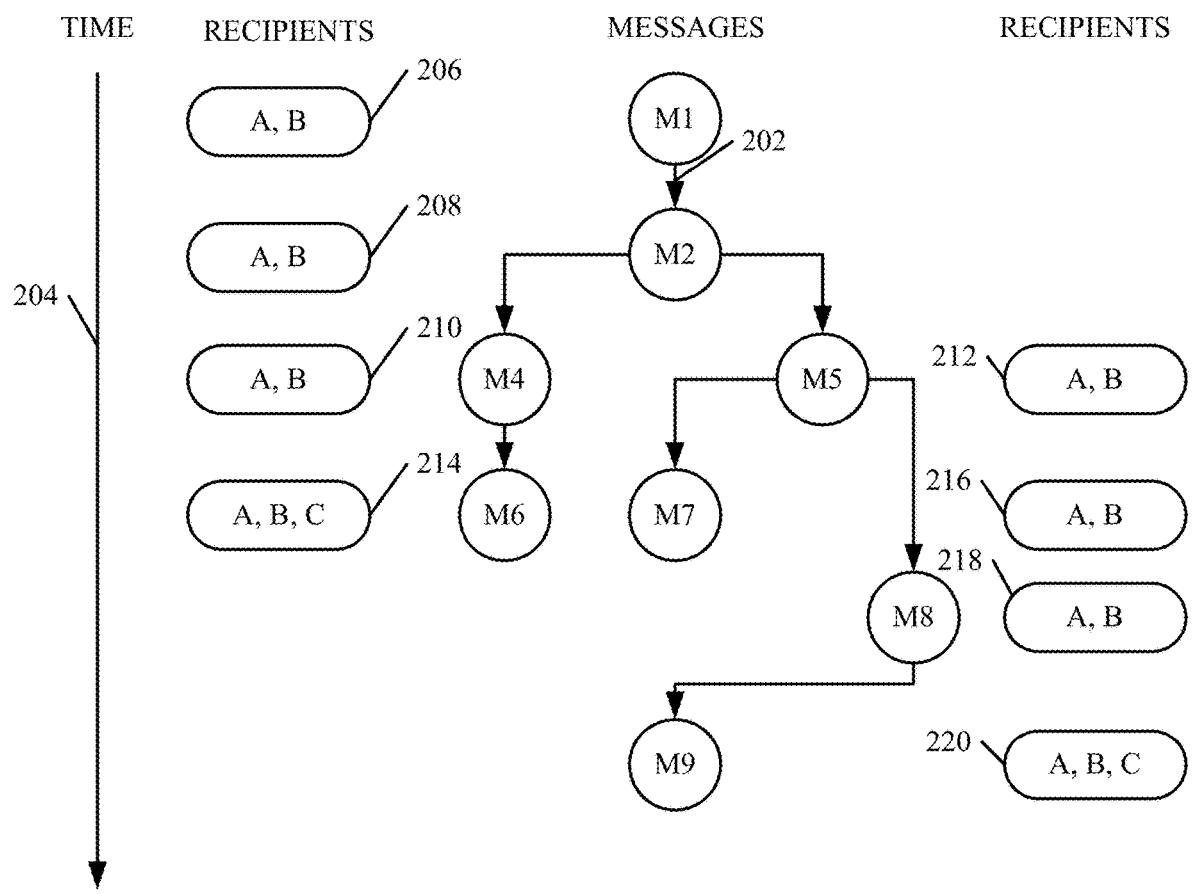
FIG. 4 shows one exemplary set of messages and recipients that can be grouped into a single conversation using the architecture shown in FIG. 1.

An example may be helpful. FIG. 4 is a diagram 200 that shows a set of messages (labeled M1-M9) along with the recipients of those messages, arranged along a timeline 204. An arrow indicates that the message on the outbound end of the arrow is in reply to the message on the originating side of the arrow. For instance, message M1 is connected to message M2 by arrow 202. This indicates that message M2 is in reply to message M1 (e.g., message M1 is the parent of message M2).

Diagram 200 also shows that messages M4 and M5 are both in reply to message M2. Recipient identifiers 206, 208, 210 and 212 show that messages M1, M2, M4 and M5 all have the same recipients (recipients A and B). Diagram 200 shows that message M6 is in reply to message M4, and it has an additional recipient (recipient C), as indicated by message identifier 214.

Diagram 200 also shows that message M7 is in reply to message M5, and it has recipients A and B as indicated by recipient identifier 216. Message M8 is also in reply to message M5 and it has recipients A and B as indicated by identifier 218. Message M9 is in reply to message M8 and it also has a set of recipients A, B and C as indicated by message identifier 220.

By following the flow diagram of FIG. 3, it can be seen that conversation/thread identifier system 136 will identify all of the messages M1-M9 as being part of the same thread in the same conversation. Message M1 is not in reply to any other message that is identified by messaging system 102. Therefore, at block 176 of FIG. 3, it will be determined that a new conversation should be started and message M1 added to it.

Message M2 is in reply to message M1. This will be determined at block 174 of FIG. 3 and, at block 184, it will be determined that the recipients of message M2 are the same as those for message M1. Thus, processing skips to block 186 and message M2 is added to the same thread in the same conversation as message M1.

Message M4 is in response to message M2 and, again, the recipients are the same as for message M2. Thus, message M4 will be added to the same thread in the same conversation as well.

Even though message M5 is a separate reply to message M2 (separate from message M4), the recipients of message M5 are the same as those for message M2. Therefore, message M5 will also be added to the same thread in the same conversation as messages M1, M2 and M4.

Now message M6 is received. It is in response to message M4. This will be identified at block 174. However, at block 184, it will be determined that the recipients (A, B and C) are not that same as those for the parent message M4. Thus, processing will proceed with respect to block 186 in FIG. 3 where it will be determined that the recipients of message M6 are a superset of the recipients of message M4 (that is, message M6 includes all of the recipients of the parent message M4 plus one or more additional recipients). Thus, a new person notification will be added to message M6 at block 188 in FIG. 3, and message M6 will be added to the existing thread in the same conversation which already contains messages M1, M2, M4 and M5.

When message M7 is received, it will be determined that it is in reply to a message that is already part of an existing conversation, and that its recipients are the same as its parent message. Therefore, it will be added to the same thread in the existing conversation that includes messages M1, M2, M4, M5 and M6. The same is true of message M8.

Now, when message M9 is received, it will be determined that it is in response to message M8, which is already part of an existing conversation, at block 174. At block 184, it will be determined that the recipients of message M9 are not the same as those of its parent, but at block 186 it will be determined that they are a superset of those in the parent. Thus, message M9 will be added to the same thread in the same conversation as well.

It can thus be seen that, using conventional message grouping techniques, the messages shown in FIG. 4 would have several forks (where more than one person replied to the same message) that a user would have to deal with. However, using the conversation/thread identifier system 136, they are all grouped into a common thread in the same conversation, and can be acted on collectively.

It will also be appreciated, however, that the present system also maintains confidentiality. For instance, if one of the messages only had a subset of the recipients of its parents, it would not be added to the thread in the already-existing conversation, even though its parent was in that thread and conversation. This is because a user may intend to only send certain information to a subset of the members of a given conversation. In that case, at block 186, a new conversation and/or thread would be started and the newly received message would be added to the new conversation and/or thread. However, as shown in FIG. 4, because all of the messages in M1-M9 are part of the same thread in the same conversation, when anyone replies to any of those messages, so long as the recipients of the reply are either the same as, or a superset of, the recipients of the parent or ancestor messages (whichever is identified), then everyone in that thread will get the reply, even if it is not in a direct chain of descendency from all of the messages in the thread. That is, the messages derive from the same root, but are not necessarily in the same linear chain.

By way of example, it can be seen that message M8 is in reply to message M5, and message M8 only has recipients A and B. However, because message M8 is part of the thread and conversation that all the other messages are in, recipient C will also be able to see message M8. This allows the sender of message M8 to respond to all of the recipients in the conversation, without selecting and responding to independently addressable messages in the conversation.

Figure 5:
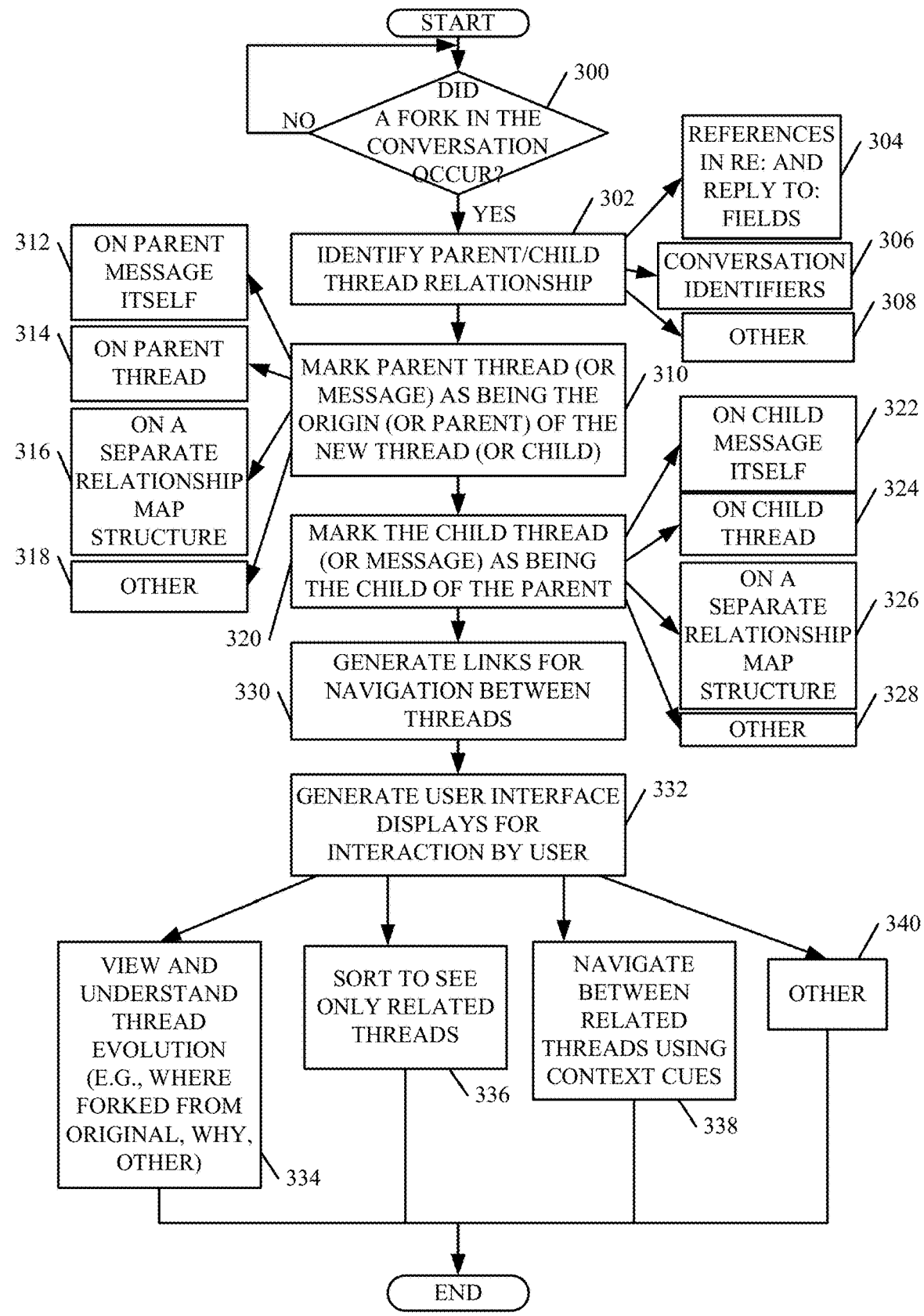
FIG. 5 is a flow diagram illustrating one embodiment of the operation of the system in FIG. 1 in managing related threads.

FIG. 5 is flow diagram illustrating one embodiment of the operation of messaging system 102 in establishing relationships between threads, where a fork has occurred and a new thread is spawned from an older thread. In one embodiment, the messaging system first determines that a fork has occurred in the present conversation that is being viewed by a user. By way of example, a fork may occur because of the operation of the messaging system as described above with respect to FIG. 3 in creating threads of related messages, or a fork in a conversation can occur in other ways as well. In any case, it is assumed for the sake of the present discussion that the messaging system has identified that a fork in the conversation has occurred. This is indicated by block 300 in FIG. 5.

The thread relationship identifier component 125 in messaging system 102 then identifies the parent/child relationship between the original thread, and the new thread that was created based on the fork. This is indicated by block 302. In one embodiment, component 125 references the "Re:" line and the "Reply To" fields to identify the parent/child relationship. This is indicated by block 304. In another embodiment, component 125 accesses the conversation identifier associated with the parent thread, and the newly created child thread. This can be used to establish the parent/child relationship as well. This is indicated by block 306. The messaging system can also use other ways 308 for identifying the relationship between threads.

Once the messaging system has identified which thread is the parent and which is the child, it illustratively marks the parent thread (or the message in the parent thread that spawned the fork) as being the origin (e.g., parent) of the new thread (e.g., the child thread). This is indicated by block 310 in FIG. 5. By way of example, the messaging system can mark the relationship on the parent message, itself. This is indicated by block 312. It can also mark it on the parent thread (that is, along with a thread identifier that identifies a set of messages as being part of a common thread). This is indicated by block 314. It will also be noted that the messaging system can track the parent/child relationships by placing the relationship identifiers 133 in a separate relationship map structure. This is indicated by block 316. It can mark the parent thread in other ways as well, and this is indicated by block 318.

In one embodiment, component 125 of messaging system 102 also marks the child thread (or the first message in the child thread) as being the child of the parent. This is indicated by block 320. Again, this can be done in a variety of different ways. For instance, this information can be marked on the child message (the first message in the child thread), itself. This is indicated by block 322. It can be indicated along with the thread identifier on the child thread. This is indicated by block 324. It can also be indicated in a separate relationship map structure, as indicated by block 326. It will be noted that component 125 in the messaging system 102 can mark the child thread as being a child in the parent/child relationship in other ways as well, and this is indicated by block 328.

The messaging system then illustratively generates a link between the related threads. That is, where a parent/child relationship is identified in the threads accessible by a user, a link is placed between those threads so that the user can navigate back and forth among related threads. This is indicated by block 330 in FIG. 5.

Related thread visualization component 127 in messaging system 102 then illustratively generates one or more user interface displays that allow the user to view and interact with the related threads. This is indicated by block 332. This can also take a wide variety of different forms.

For instance, in one embodiment, the visualization component 127 displays the user interface display so that the user can simply view and understand the thread evolution. That is, the user can view and understand where a fork occurred from an original thread, why that fork occurred, and other information about the parent/child relationship as well. This is indicated by block 334. The visualization component 127 also illustratively generates user interface display elements that allow the user to sort conversations in the user's messaging system to see only related threads. This is indicated by block 336. The user interface display also illustratively includes display elements that allow the user to navigate between related threads, using context cues. This is indicated by block 338. The messaging system can generate the user interface displays in other ways as well. This is indicated by block 340.

FIGS. 6A-6F show some exemplary user interface displays indicating how related threads can be displayed and how a user can interact with them. They will be discussed, in turn.

Figure 6A:
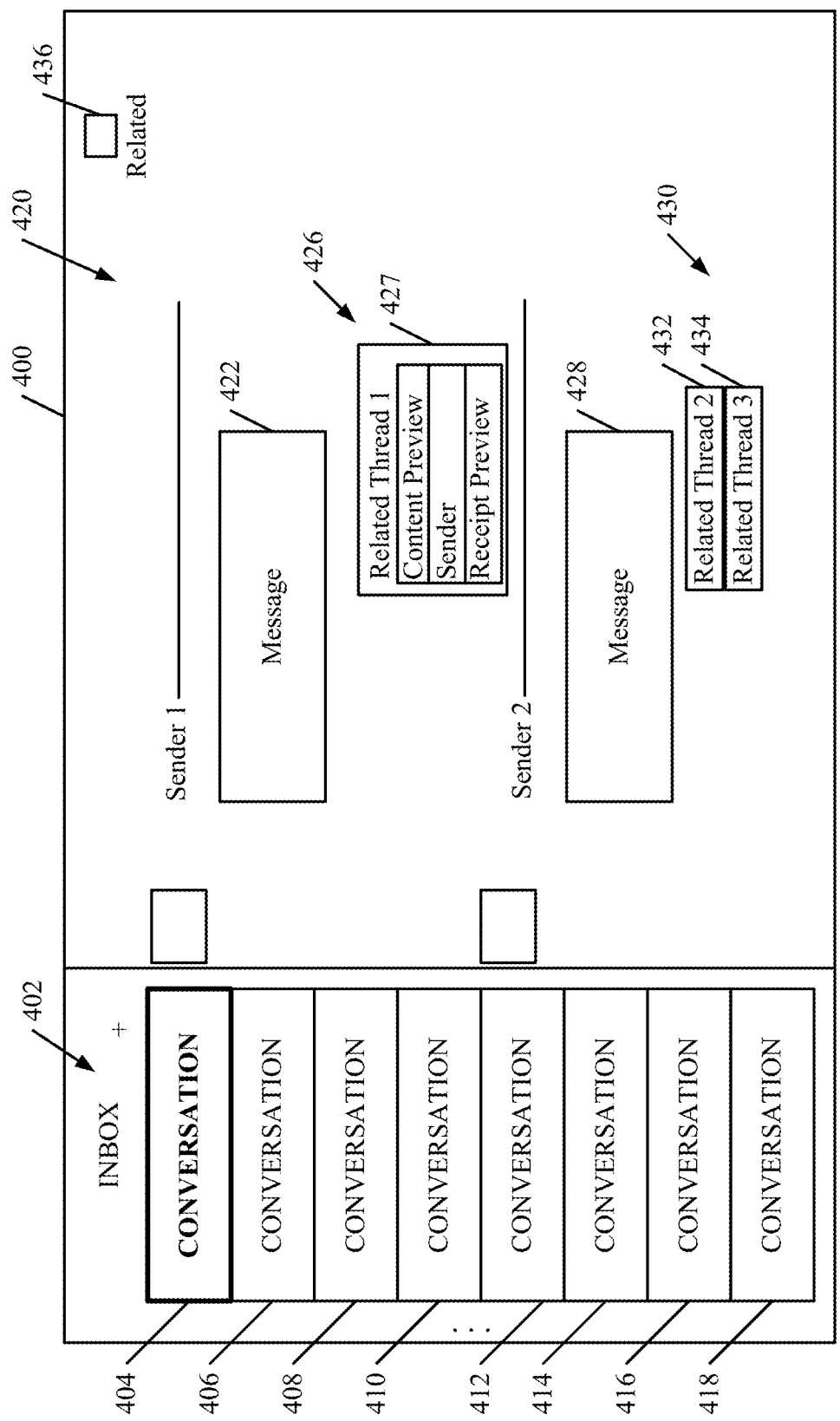
FIGS. 6A-6F are illustrative user interface displays.

FIG. 6A shows one embodiment of a user interface display 400. Display 400 illustratively shows a display generated by an e-mail system. However, e-mail is only one example of a messaging system, and others could be used as well. User interface display 400 illustratively includes an inbox portion 402 that has a plurality of different conversation display elements 404, 406, 408, 410, 412, 414, 416, and 418. Each of the conversation display elements 404-418 is illustratively a user actuatable input mechanism, such as an icon, a link, etc. When the user actuates one of the display elements 404-418, a more detailed conversation display 420 is generated. Conversation display 420 includes a first sender message display element 422 that shows a message in the present conversation from a first sender. It also includes a second sender message display 424 that shows a message from a second sender.

Conversation display 420 also illustratively includes a related threads display section 426 that corresponds to threads that are related to the thread in which the first sender message 422 resides. It can be seen in FIG. 6A that related thread display section 426 identifies one related thread with a display element 427. Each related section 426 for a related thread will illustratively include a variety of information. For instance, it can include a content preview of the content of the related thread, a sender identifier identifying one or more senders in the related thread, and a recipients preview that allows a user to preview the recipients in the related thread.

The second sender message display 424 also includes a related threads display section 430 that identifies related threads corresponding to the thread in which message 428 resides. In the embodiment shown in FIG. 6A, there are two related threads in section 430, each corresponding to a related thread display element 432 and 434, respectively. Again, the related thread display elements 432 and 434 can contain similar information to the display element for related thread 427, or different information.

The user interface display elements in section 420 are illustratively user actuatable display elements that navigate the user to more detailed information corresponding to the display element. For instance, the display element for message 422, when actuated by the user, illustratively displays the full content of that message in a larger format. When the display element for related thread 426 is actuated, the user is illustratively navigated to that thread, and so on.

FIG. 6A also shows that user interface display 400 can include a sort user input mechanism 436 as well. Mechanism 436 allows the user to sort the conversations in the user's messaging system into related conversations. Sorting is described in greater detail below with respect to FIG. 6F.

Figure 6B:
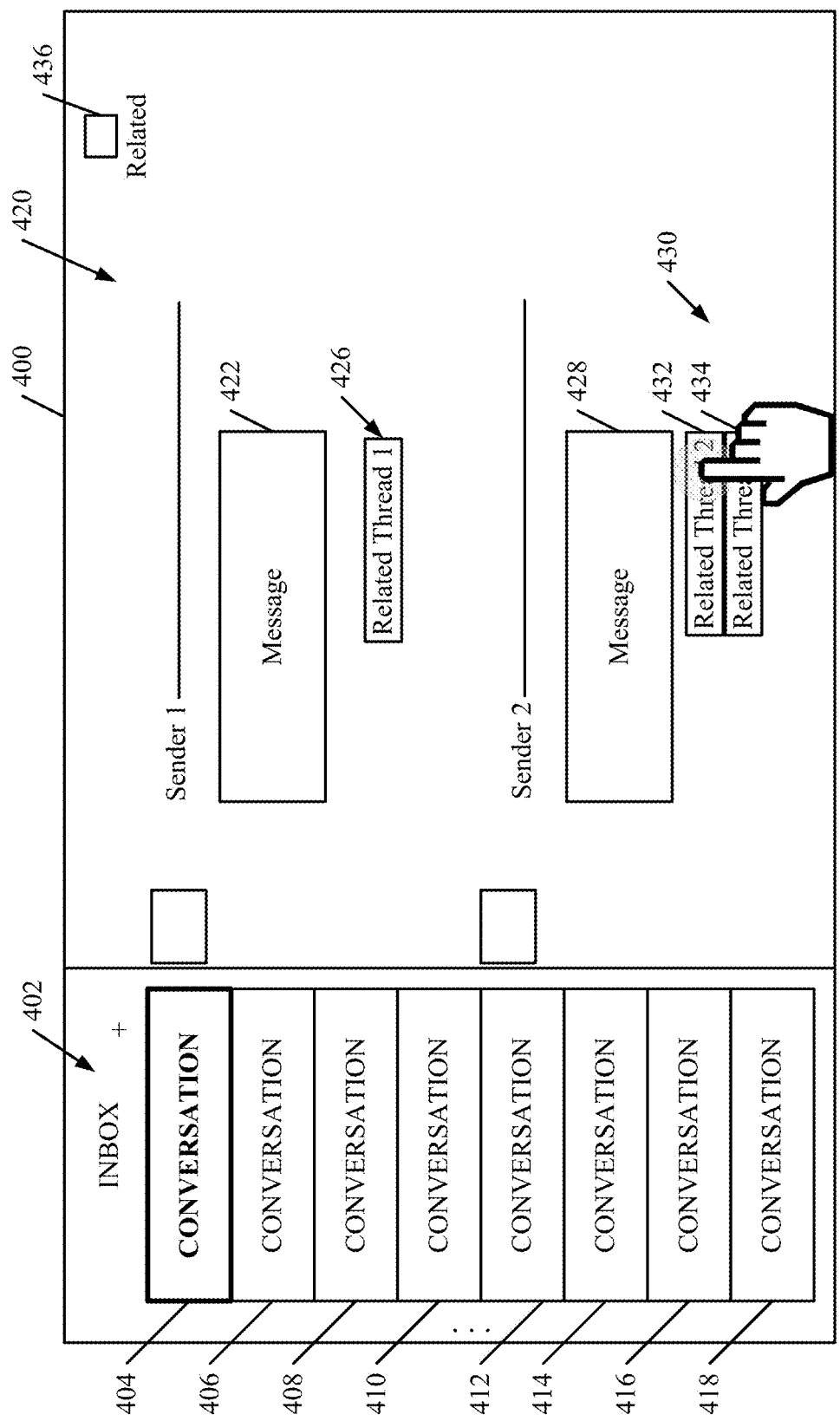

FIG. 6B shows another embodiment of the user interface display 400 shown in FIG. 6A, and similar items are similarly numbered. However, FIG. 6B shows that the user is now actuating the display element 432 corresponding to the related thread in section 430. When the user actuates display element 432, the messaging system illustratively navigates the user to a display of information for the related thread corresponding to the display element 432.

Figure 6C:
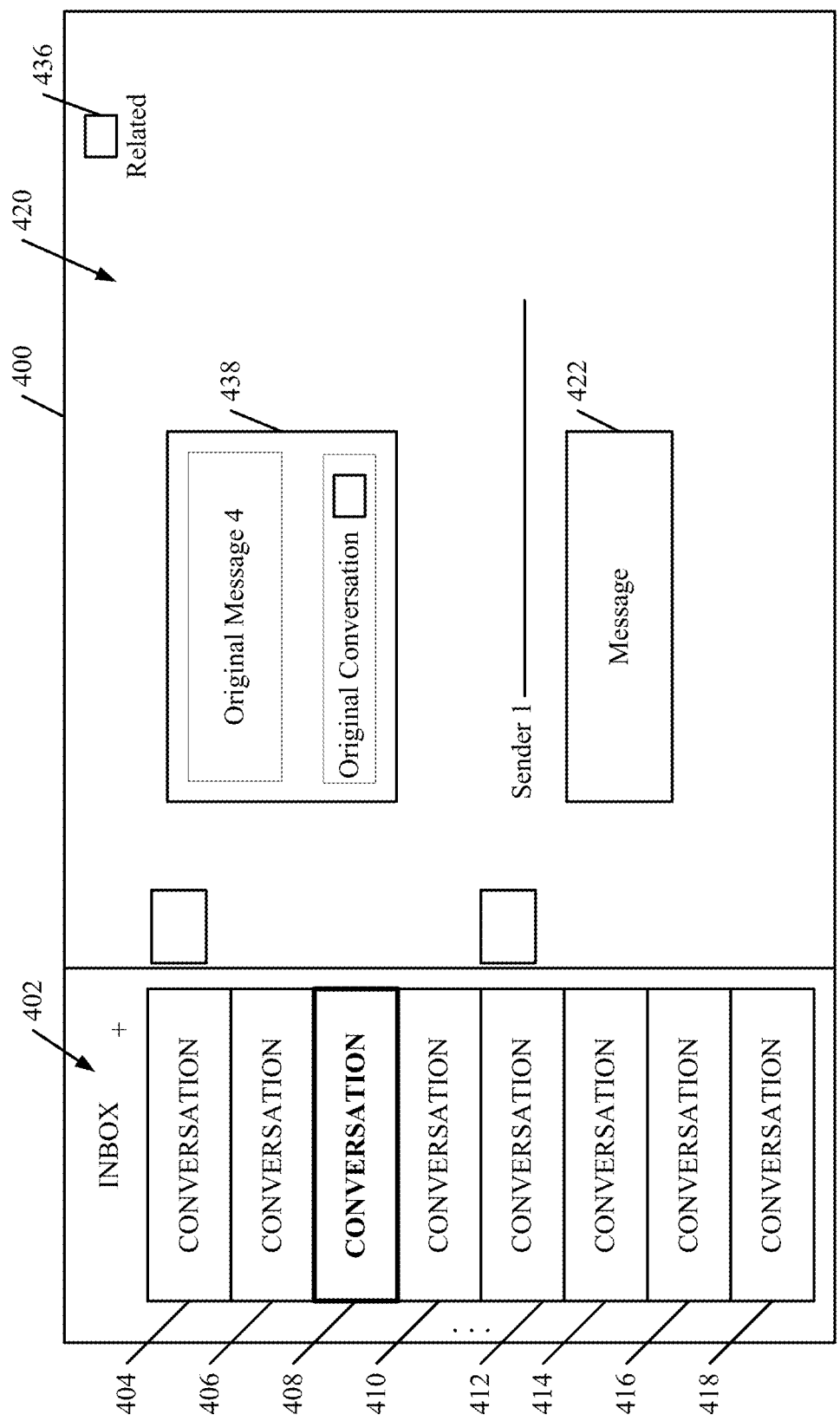

FIG. 6C shows one embodiment of this. It can be seen in FIG. 6C that the user's inbox portion 402 has now been changed to indicate that the current conversation being displayed in section 420 corresponds to display element 408, instead of display element 404 (as it was in FIG. 6B). Section 420 also includes an original message display element 438 that shows the original message for the conversation corresponding to display element 408. Thus, when the user actuates display element 432 in user interface display 6B, the user is navigated back to the underlying thread that spawned the message corresponding to display element 422. Because the messaging system knows the relationship between the related thread represented by display element 432, and the current thread represented by the message corresponding to display element 422, the messaging system can show historical information with a visual distinction that indicates that message 438 is not part of the current thread, but instead it is part of the parent thread that spawned the current thread. This allows the user to easily see how the current thread started.

Figure 6D:
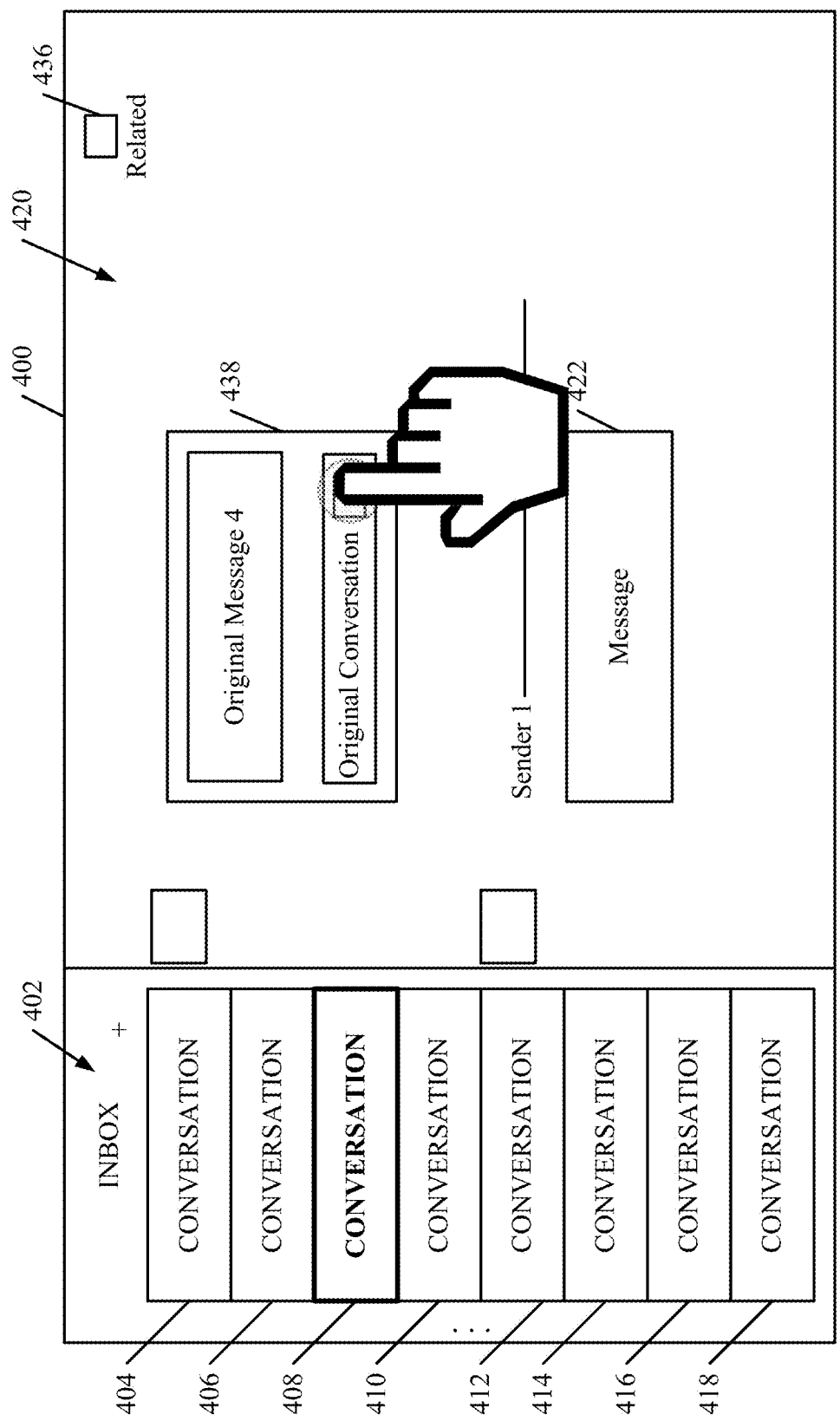

FIG. 6D is similar to the display shown in FIG. 6C, and similar items are similarly numbered. However, it can be seen in FIG. 6D that the user can actuate the historical display element 438 corresponding to the parent thread, that spawned the current thread. When the user does this, the user is illustratively navigated to the original thread, of which the message corresponding to display element 438 is a part.

Figure 6E:
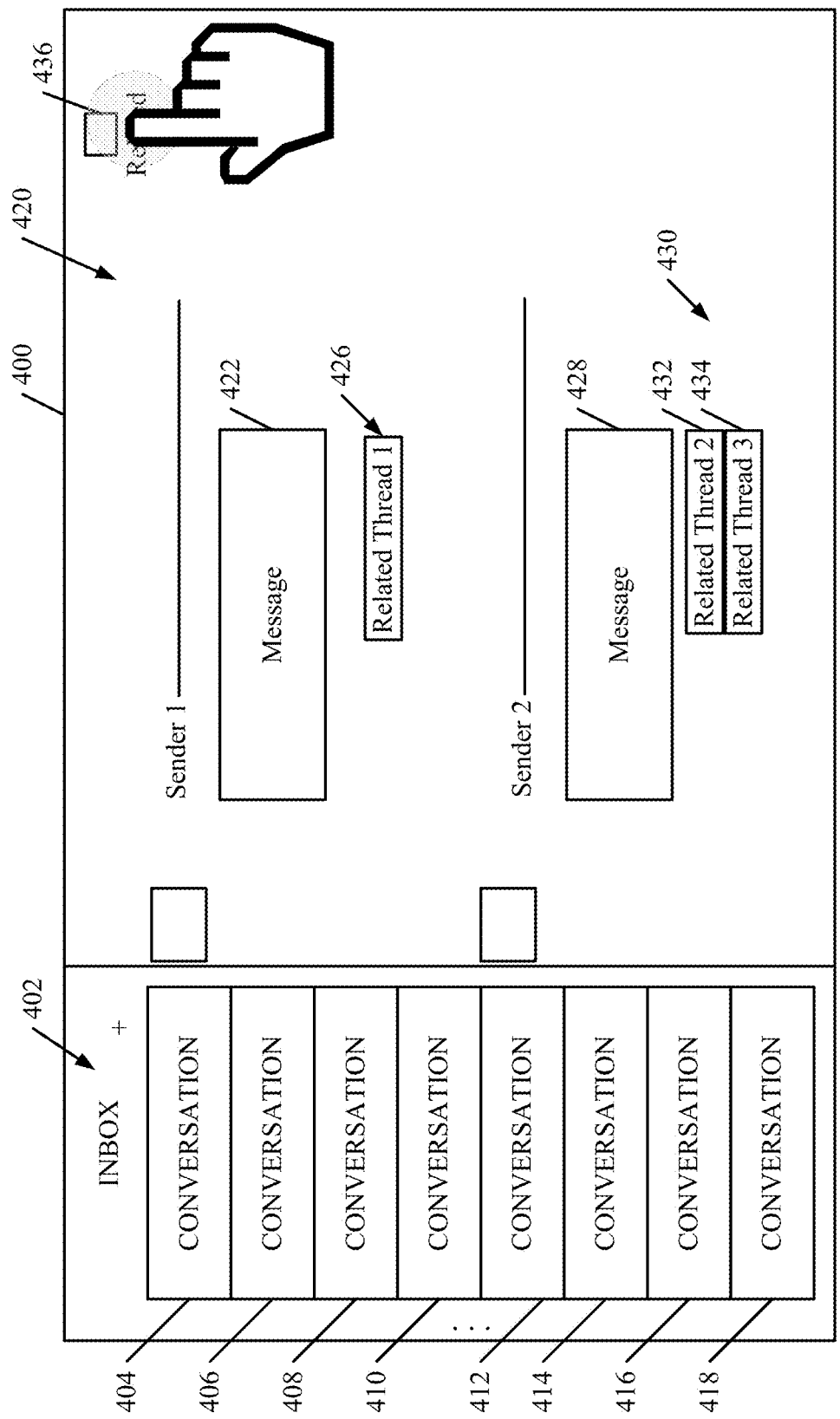
Figure 6F:
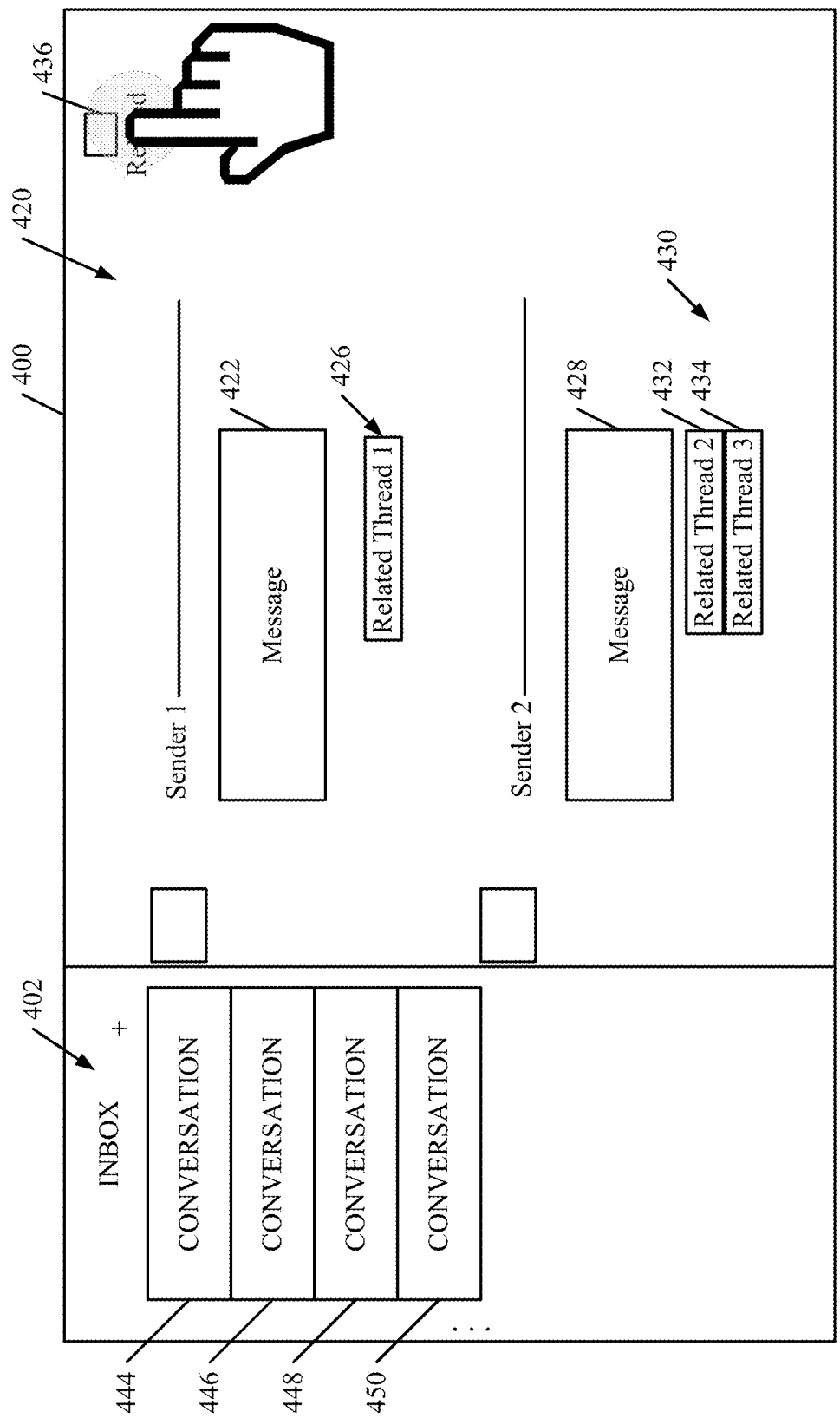

FIGS. 6E and 6F are user interface displays that illustrate the message sort functionality that can be used to sort the user's inbox by related threads. FIG. 6E is similar to FIG. 6B, and similar items are similarly numbered. However, FIG. 6E shows that the user is now actuating the sort mechanism 436 to sort the inbox portion 402 to show related threads (or conversations). When the user does this, the messaging system illustratively searches the message store, using the parent/child relationship identifiers (either in the message threads themselves or in a separate mapping structure) to identify all threads that are related to the present thread. In one embodiment, all related threads are identified, regardless of whether they are ancestor or descendent threads. The messaging system then displays a set of display elements (or links) corresponding to the related threads, in the inbox section 402 of the display.

FIG. 6F is one illustrative user display indicating this. It can be seen that the display in FIG. 6F is similar to that shown in FIG. 6E, and similar items are similarly numbered. However, it can now be seen that the inbox section 402 of the display includes a set of display elements 444, 446, 448 and 450, that correspond to only conversations or threads that are related to the current thread being viewed by the user. Therefore, when the user actuates one of the display elements 444-450, the user is illustratively navigated to the corresponding, underlying thread or conversation.

It can thus be seen that, in any type of messaging system, forks in the conversations or threads are identified and the relationship between the parent (or originating) thread and the child thread is identified and recorded. It can thus be used to display threads to the user so that the user can quickly see how the threads correspond, and why they forked. It also allows the user to sort the user's messaging system by related threads, and to navigate among related threads or conversations.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

FIG. 7 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 7, some items are similar to those shown in FIG. 1 and they are similarly numbered. FIG. 7 specifically shows that messaging system 102 can be located in cloud 502 (which can be public, private, or a combination where portions are public while others are private). Therefore, users 104-106 use user devices 116-118 to access messaging system 102 through cloud 502.

FIG. 7 also depicts another embodiment of a cloud architecture. FIG. 7 shows that it is also contemplated that some elements of system 102 can be disposed in cloud 502 while others are not. By way of example, data store 128 can be disposed outside of cloud 502, and accessed through cloud 502. In another embodiment, thread relationship identifier component 125 can also be outside of cloud 502. Regardless of where they are located, they can be accessed directly by devices 116-118, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
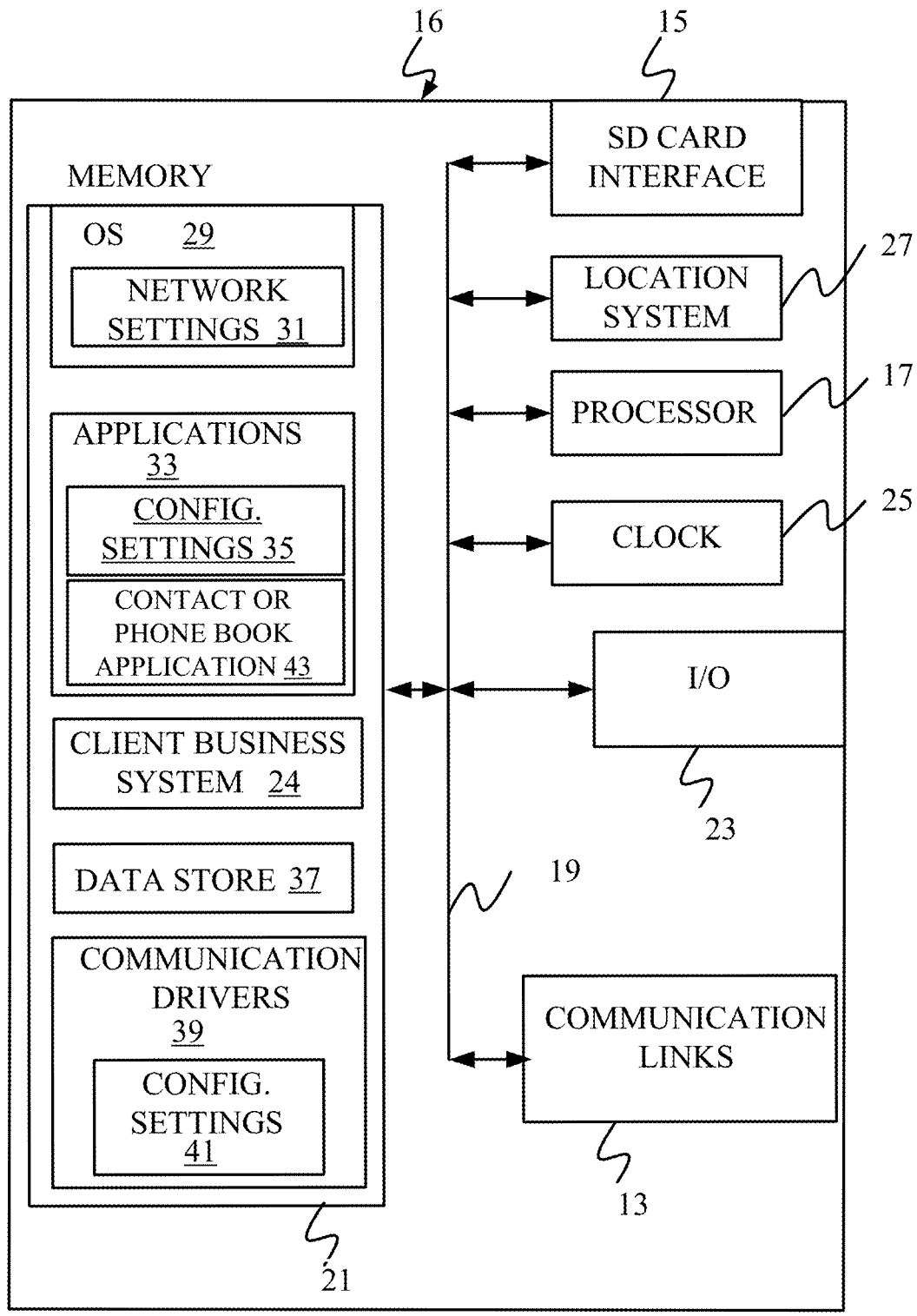
FIGS. 8-12 illustrate various examples of mobile devices that can be used by users in the architecture shown in FIG. 1.

FIG. 8 is a simplified block diagram of one illustrative embodiment of a handheld or mobile computing device that can be used as a user's or client's hand held device 16, in which the present system (or parts of it) can be deployed. FIGS. 9-12 are examples of handheld or mobile devices.

FIG. 8 provides a general block diagram of the components of a client device 16 that can run components of data architecture 100 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 126 or those on user devices 116 and 118 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 9:
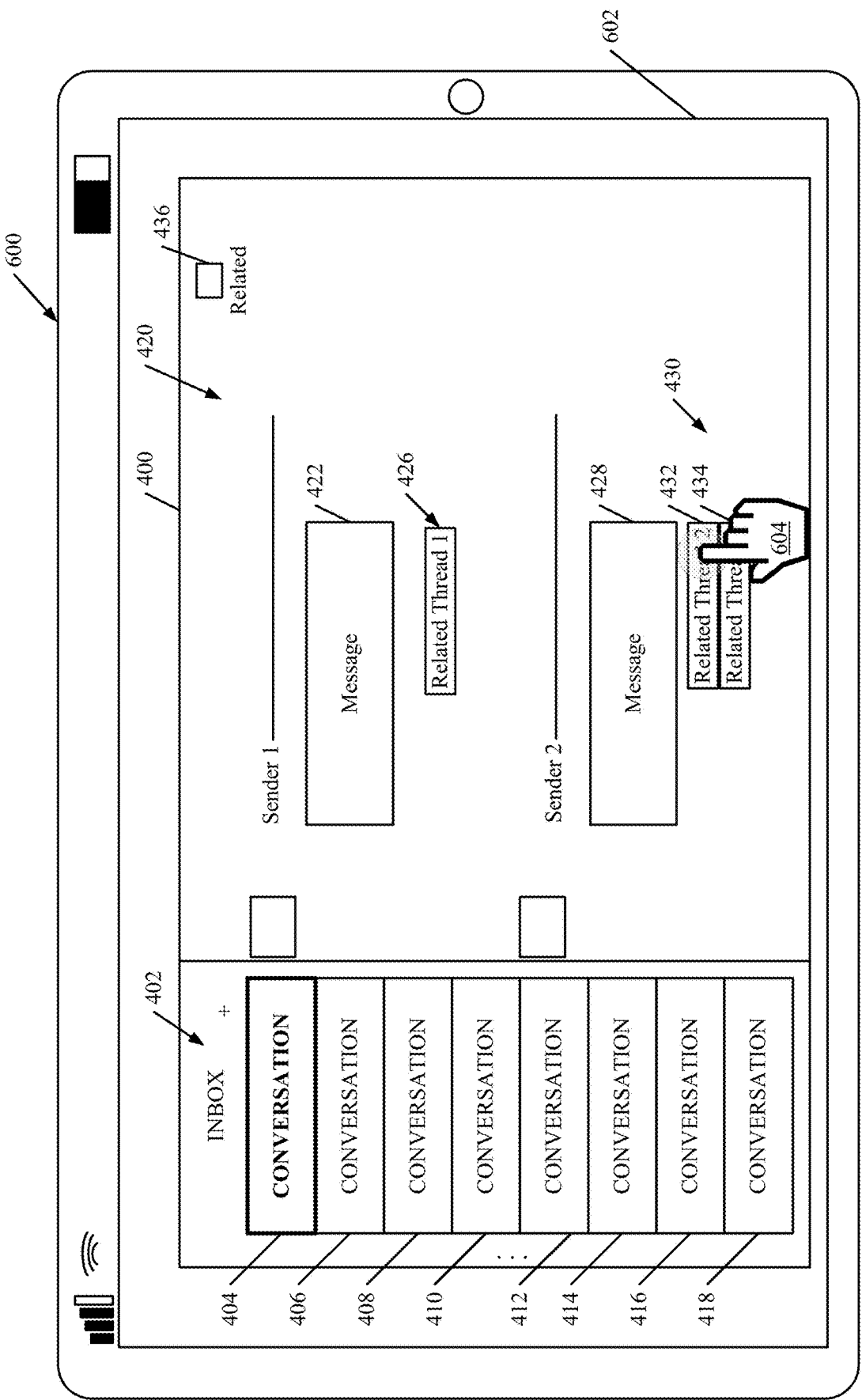

FIG. 9 shows one embodiment in which device 16 is a tablet computer 600. In FIG. 6, computer 600 is shown with user interface display (from FIG. 6B) displayed on the display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 10:
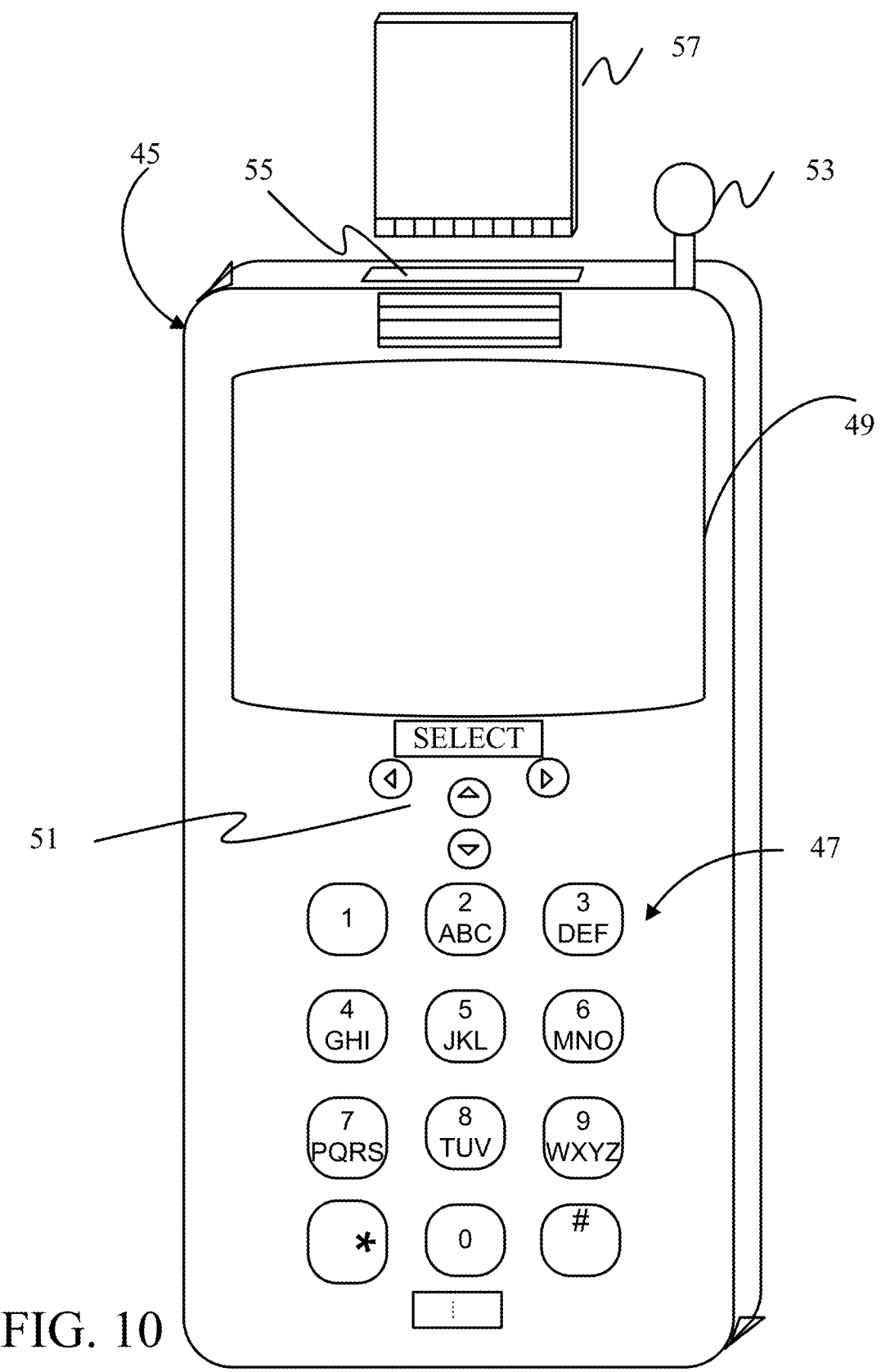
Figure 11:
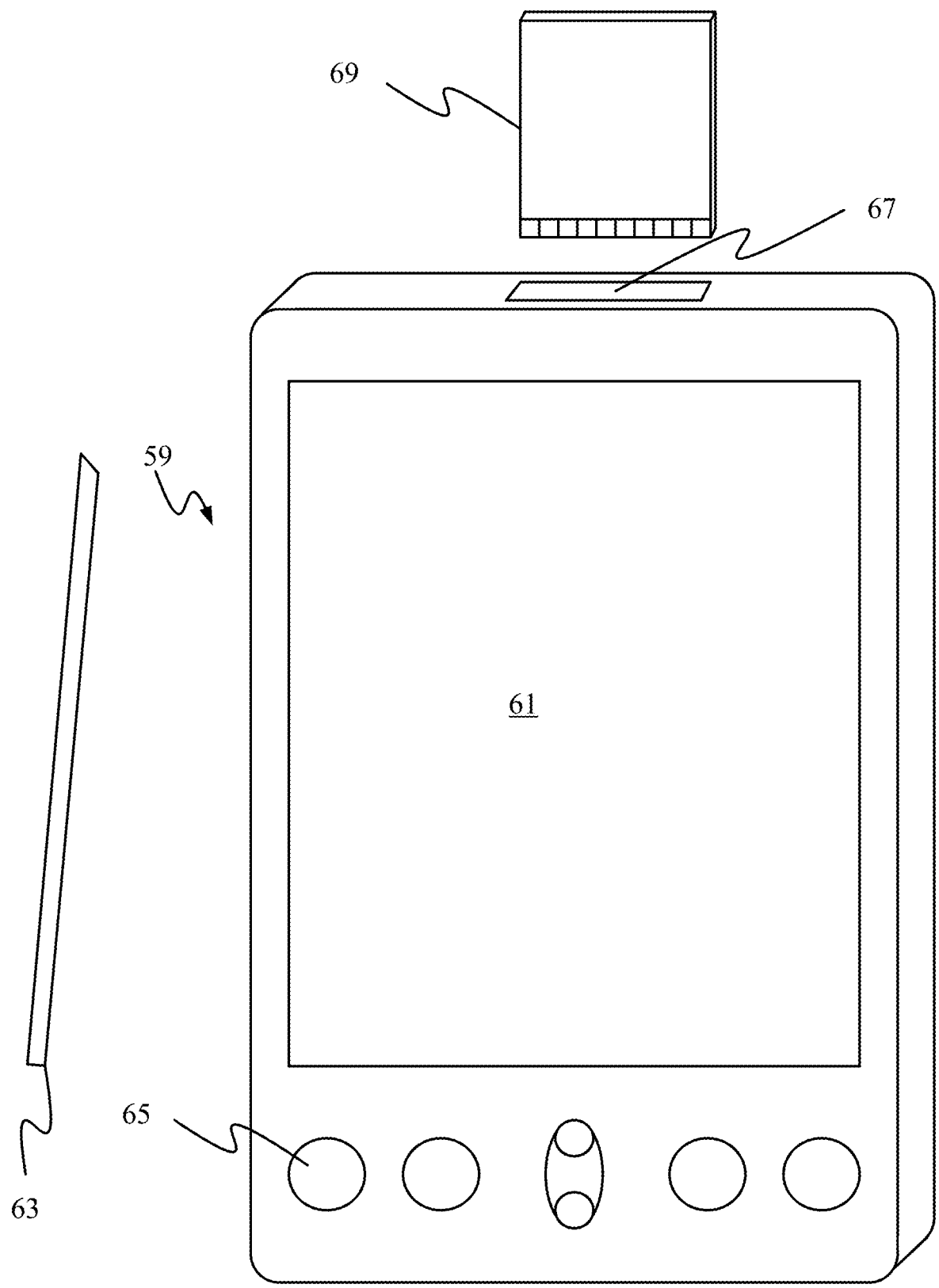

FIGS. 10 and 11 provide additional examples of devices 16 that can be used, although others can be used as well. In FIG. 10, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1xrtt, and Short Message Service (SMS) signals. In some embodiments, phone 45 also includes a Secure Digital (SD) card slot 55 that accepts a SD card 57.

The mobile device of FIG. 11 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 12:
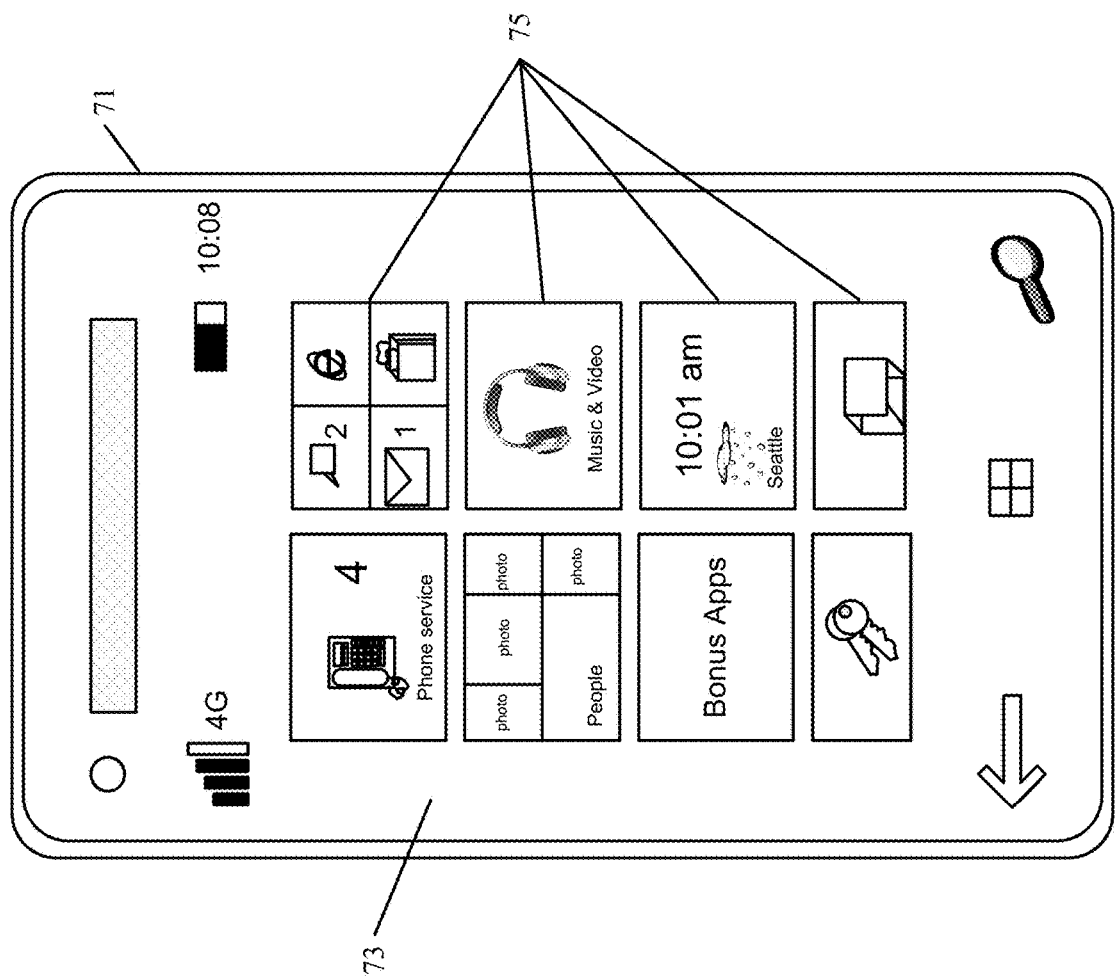

FIG. 12 is similar to FIG. 10 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
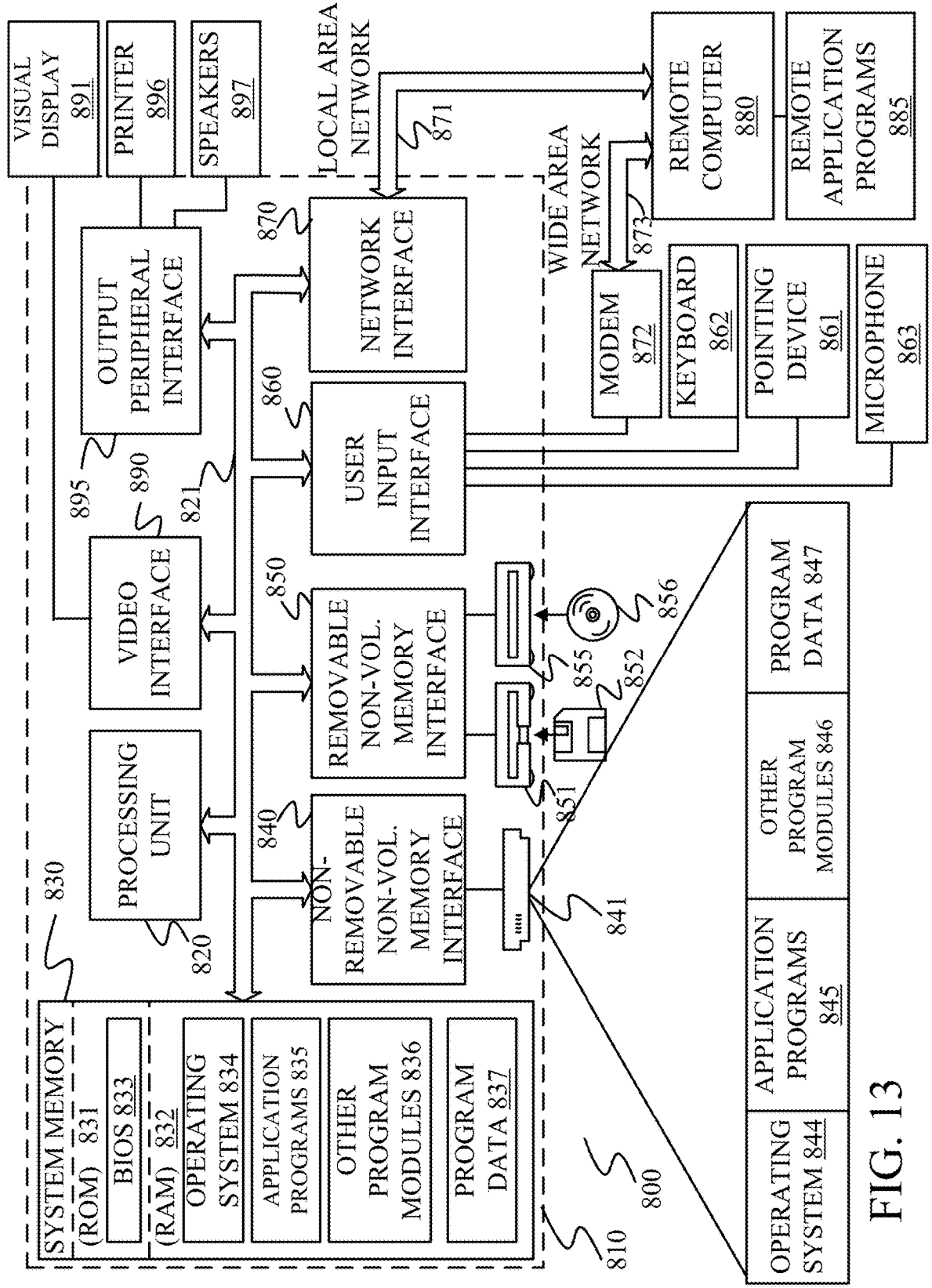
FIG. 13 is a block diagram of one illustrative computing environment.

FIG. 13 is one embodiment of a computing environment in which architecture 100, or parts of it, (for example) can be deployed. With reference to FIG. 13, an exemplary system for implementing some embodiments includes a general-purpose computing device in the form of a computer 810. Components of computer 810 may include, but are not limited to, a processing unit 820 (which can comprise processor 126 or the processors on user devices 116 and 118), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 13 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
   receiving a message;
   determining that the received message is associated with a parent message, wherein
      the parent message corresponds to a first thread and has a first plurality of participants that includes a sender of the parent message and recipients of the parent message, and
      the received message has a second plurality of participants including a sender of the received message and recipients of the received message;
   comparing the second plurality of participants to the first plurality of participants;
   based on identifying a difference between the second plurality of participants and the first plurality of participants, identifying a conversation fork between the received message and the parent message;
   based on identifying the conversation fork, automatically generating a second thread that includes the received message; and
   generating a user interface display comprising:
      a received message display element that represents the received message,
      a related thread display element that indicates that the second thread forked from the first thread, and
      a parent message display element that represents the parent message of the first thread and identifies the first set of recipients associated with the parent message.

2. The computer-implemented method of claim 1 wherein the received message display element comprises message information corresponding to the received message.

3. The computer-implemented method of claim 2 wherein the parent message display element includes a content section indicative of content in the first thread and a recipient section identifying the recipients of the parent message.

4. The computer-implemented method of claim 2, and further comprising:
   based on receiving an indication of user actuation of the related thread display element, automatically displaying a related thread user interface display showing messages in the first thread.

5. The computer-implemented method of claim 4 wherein displaying a related thread user interface display comprises:
   displaying the parent message in the first thread, from which the conversation fork was identified.

6. The computer-implemented method of claim 1 wherein the related thread display element identifies a parent/child relationship between the first and second threads, the parent/child relationship indicating that the second thread was started from the first thread.

7. The computer-implemented method of claim 1 wherein generating a user interface display comprises:
   displaying a sort user input mechanism.

8. The computer-implemented method of claim 7 and further comprising:
   based on an indication of user actuation of the sort user input mechanism, displaying a set of message thread display elements, each corresponding to a different one of a plurality of different threads, the set of thread display elements being visually sorted based on relationships among the plurality of different threads.

9. The computer-implemented method of claim 8 wherein the user interface display represents the second thread under focus and wherein displaying a set of message thread display elements comprises:
   displaying only message thread display elements for threads that are related to the second thread.

10. The computer-implemented method of claim 1, wherein identifying a difference between the second plurality of users and the first plurality of users comprises determining that the second plurality of users is not a superset of the first plurality of user.

11. An electronic messaging system, comprising:
   at least one processor; and
   memory storing instructions executable by the at least one processor, wherein the instructions, when executed, configure the electronic messaging system to provide:
      a conversation identifier component configured to analyze a received message to determine that the received message is associated with a parent message, wherein
         the parent message corresponds to a first thread within an existing conversation and has a first plurality of participants that includes a sender of the parent message and recipients of the parent message, the received message has a second plurality of participants including a sender of the received message and recipients of the received message, the existing conversation comprises a set of messages in a set of threads, each thread being actionable as a single communication unit, and the first thread includes a first subset of the messages;

a recipient analysis component configured to compare the second plurality of participants to the first plurality of participants;

a relationship identifier component configured to identify a conversation fork between the received message and the parent message based on a difference between the second plurality of participants and the first plurality of participants;

a conversation generator component configured to:
based on the identified conversation fork and the determination that the parent message corresponds to the first thread, automatically generate a second thread that includes the received message; and a related thread visualization component configured to generate a user interface display that represents the second thread and includes:
a user input mechanism configured to interact with the second thread; and
a display element that:
displays fork information indicative of an association between the first thread and the second thread; and
includes a navigation link configured to navigate between the second subset of messages and the first subset of messages.

12. The electronic messaging system of claim 11 wherein the relationship identifier component is configured to generate a relationship identifier that identifies the first thread as an ancestor thread to the second thread.

13. The electronic messaging system of claim 12 wherein the relationship identifier component is configured to mark the parent message in the first thread, to which the received message is related, as well as the received message, with the relationship identifier.

14. The electronic messaging system of claim 12, wherein the relationship identifier component is configured to mark the first thread and the second thread with the relationship identifier.

15. The electronic messaging system of claim 12 wherein the received message comprises a first reply to the parent message, and the recipient analysis component is configured to:
compare a third set of recipients of a second received message that is a second reply to the parent message; and
based on the comparison, place the second received message in a same thread as the first received message.

16. The electronic messaging system of claim 12 wherein the visualization component is configured to generate the user interface display to include a sort user input mechanism, and, based on actuation of the sort user input mechanism, generate the user interface display to include thread display elements, each thread display element corresponding to a different thread, the thread display elements being sorted based on relationships among the threads.

17. The electronic messaging system of claim 11, wherein the relationship identifier component is configured to identify the conversation fork based on determining that the second set of recipients is not a superset of the first set of recipients.

18. A computing system comprising:
at least one processor; and
memory storing instructions executable by the at least one processor, wherein the instructions, when executed, configure the computing system to:
receive a message;
determine that the received message is associated with a parent message, wherein
the parent message corresponds to a first thread and has a first plurality of participants that includes a sender of the parent message and recipients of the parent message, and
the received message has a second plurality of participants including a sender of the received message and recipients of the received message;
based on determining a difference between the second plurality of participants and the first plurality of participants, identify a conversation fork between the received message and the parent message;
in response to identifying the conversation fork automatically generate a second thread that includes the received message; and
generate a user interface display comprising:
a received message display element that represents the received message,
a related thread display element that corresponds to the first thread and indicates that the second thread forked from the first thread, and
a parent message display element that represents the parent message of the first thread and identifies the first set of recipients associated with the parent message.

19. The computing system of claim 18 wherein the instructions configure the computing system to:
display a sort user input mechanism;
receive actuation of the sort user input mechanism; and
display a set of message thread display elements, each corresponding to a different one of a plurality of different threads, the set of thread display elements being visually sorted based on relationships among the plurality of different threads.

20. The computing system of claim 19 wherein user interface display represents the second thread under focus and wherein displaying a set of message thread display elements comprises:
displaying only message thread display elements for threads that are related to the second thread.

* * * * *

UNITED STATES PATENT AND TRADEMARK OFFICE
CERTIFICATE OF CORRECTION

PATENT NO. : 10,587,539 B2
APPLICATION NO. : 14/209604
DATED : March 10, 2020
INVENTOR(S) : Mahood et al.

Page 1 of 1

It is certified that error appears in the above-identified patent and that said Letters Patent is hereby corrected as shown below:

On the Title Page

Item (73), Assignee: change "Microsoct Technology Licensing, LLC" to "Microsoft Technology Licensing, LLC"

Signed and Sealed this
Twenty-sixth Day of May, 2020

Andrei Iancu
*Director of the United States Patent and Trademark Office*